US012638733B2

(12) United States Patent
Wang et al.

(10) Patent No.: US 12,638,733 B2
(45) Date of Patent: May 26, 2026

(54) DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xiao Wang, Beijing (CN); Xiaofeng Yin, Beijing (CN); Yuqing Liu, Beijing (CN); Yan Yan, Beijing (CN); Yu Ma, Beijing (CN); Weitao Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 184 days.

(21) Appl. No.: 18/290,985

(22) PCT Filed: Jul. 15, 2022

(86) PCT No.: PCT/CN2022/106017
§ 371 (c)(1),
(2) Date: Jan. 22, 2024

(87) PCT Pub. No.: WO2024/011597
PCT Pub. Date: Jan. 18, 2024

(65) Prior Publication Data
US 2024/0345444 A1     Oct. 17, 2024

(51) Int. Cl.
G02F 1/1362          (2006.01)
G02F 1/1368          (2006.01)

(52) U.S. Cl.
CPC ...... *G02F 1/136286* (2013.01); *G02F 1/1368* (2013.01)

(58) Field of Classification Search
CPC ........................ G02F 1/136286; G02F 1/1368
See application file for complete search history.

(56) References Cited

U.S. PATENT DOCUMENTS 8,049,412 B2     11/2011   Kwak
8,701,991 B2      4/2014   Chang et al.
(Continued)

FOREIGN PATENT DOCUMENTS

CN            1873483 A      12/2006
CN          101521221 A       9/2009
(Continued)

*Primary Examiner* — Lucy P Chien
(74) *Attorney, Agent, or Firm* — Dilworth & Barrese, LLP.; Michael J. Musella, Esq.

(57) ABSTRACT

A display panel and a display device are provided, which includes: a first common electrode bus line, a second common electrode bus line and a conductive connection layer, the first common electrode bus line includes a main body part and a branch part, at least a part of the branch part connected with the main body part extends along a second direction; the second common electrode bus line extends along the second direction to a side away from the display region, a first end of the second common electrode bus line directly faces the end of the main body part and the branch part; the conductive connection layer is electrically connected with the branch part of the first common electrode bus line and the first end of the second common electrode bus line.

20 Claims, 9 Drawing Sheets

(56)        References Cited

U.S. PATENT DOCUMENTS

| | | | |
|---|---|---|---|
| 8,704,991 B2 | 4/2014 | Chang et al. | |
| 9,429,801 B2 | 8/2016 | Han | |
| 11,249,571 B2 | 2/2022 | Yang et al. | |
| 11,883,646 B2 | 1/2024 | Kim et al. | |
| 12,328,993 B2 * | 6/2025 | Xu | H10K 59/124 |
| 2013/0201169 A1 | 8/2013 | Ahn | |
| 2018/0224691 A1 | 8/2018 | Wu et al. | |

FOREIGN PATENT DOCUMENTS

| | | | | |
|---|---|---|---|---|
| CN | 102544053 A | | 7/2012 | |
| CN | 103946740 A | * | 7/2014 | G02F 1/1339 |
| CN | 104142588 A | | 11/2014 | |
| CN | 104427788 A | | 3/2015 | |
| CN | 105097772 A | | 11/2015 | |
| CN | 105226200 A | | 1/2016 | |
| CN | 106019724 A | | 10/2016 | |
| CN | 206163482 U | | 5/2017 | |
| CN | 107065331 A | | 8/2017 | |
| CN | 111554660 A | | 8/2020 | |
| CN | 112259603 A | | 1/2021 | |
| CN | 112271184 A | | 1/2021 | |
| CN | 112433633 A | | 3/2021 | |
| CN | 114206430 A | | 3/2022 | |
| JP | 11186495 A | | 7/1999 | |
| KR | 1020140087436 A | | 7/2014 | |
| WO | 2021059468 A1 | | 9/2019 | |

* cited by examiner

DISPLAY PANEL AND DISPLAY DEVICE

TECHNICAL FIELD

The present disclosure relates to a display panel and a display device.

BACKGROUND

Liquid crystal display (LCD) is one of the most widely used flat panel displays. It has the advantages of thinness, high color gamut, low power consumption and strong portability, and has been widely used in televisions, monitors, notebook computers and other display products. The liquid crystal display panel is one of the non-luminous image display devices, which includes a color filter substrate, an array substrate with thin film transistors formed thereon, and a liquid crystal layer formed by injection between the color filter substrate and the array substrate. Because the liquid crystal molecules in the liquid crystal layer are anisotropic, the liquid crystal display panel can display images by using the difference of light transmittance.

The liquid crystal display panel includes a liquid crystal panel and a driving circuit for driving the liquid crystal panel, the pixel units on the liquid crystal panel are arranged in a matrix, gate lines and data lines on the liquid crystal panel intersect to define a plurality of pixel regions, and a liquid crystal cell is arranged in the pixel region. The liquid crystal panel is also provided with a common electrode and a pixel electrode for providing an electric field to each liquid crystal cell. Each pixel electrode is connected to the data line through a lead wire of the source electrode or the drain electrode of a thin film transistor that functions as a switching element, and a lead wire of the gate electrode of the switching transistor is connected to the gate line. The driving circuit includes a gate driver driving the gate line, a data driver driving the data line, and a common voltage generator driving the common electrode. The gate driver sequentially transmits gate signals to the gate lines so as to sequentially drive the liquid crystal cells on the liquid crystal panel. Therefore, the liquid crystal display panel can adjust the light transmittance of each liquid crystal cell according to the electric field applied between the pixel electrode and the common electrode after responding to the data voltage signal, and then perform image display.

SUMMARY

At least one embodiment of the present disclosure provides a display panel and a display device. In the display panel, a conductive connection layer is connected with a branch part of a first common electrode bus line through a first via hole structure in a peripheral region, and the conductive connection layer is electrically connected with a first end of a second common electrode bus line through a second via hole structure. The structural design of the display panel can increase the totle number of the first via hole structure and the second via hole structure, and reduce the resistance in a circuit structure, so as to prevent the first via hole structure and the second via hole structure from being burnt out, which leads to a decrease in the yield of the display panel and a shorter lifespan of the display panel. Moreover, in the case that the display panel is a liquid crystal display panel, the first via hole structure and the second via hole structure are arranged away from the display region, and the problem that the temperature of the liquid crystal layer in the display region of the liquid crystal display panel is raised to reach the clear point of the liquid crystal by the heat radiated from the first via hole structure and the second via hole structure can be avoided.

At least one embodiment of the present disclosure provides a display panel, and the display panel comprises: a base substrate, comprising a display region and a peripheral region surrounding the display region; a first common electrode bus line, a second common electrode bus line and a conductive connection layer which are stacked on the base substrate, the first common electrode bus line comprises a main body part and a branch part extending from an end of the main body part to a side away from the display region, the main body part extends along a first direction, and at least a part of the branch part connected with the main body part extends along a second direction, and the first direction intersects with the second direction; the second common electrode bus line extends along the second direction to a side away from the display region, and a first end of the second common electrode bus line directly faces the end of the main body part and the branch part; in the peripheral region, the conductive connection layer is electrically connected with the branch part of the first common electrode bus line through a first via hole structure, and the conductive connection layer is electrically connected with the first end of the second common electrode bus line through a second via hole structure.

For example, in the display panel provided by at least one embodiment of the present disclosure, on a plane parallel to a main surface of the base substrate, the branch part at least comprises a first bent part away from the display region, and an orthographic projection of the first via hole structure on the base substrate is at least partially overlapped with an orthographic projection of the first bent part on the base substrate.

For example, in the display panel provided by at least one embodiment of the present disclosure, on the plane parallel to the main surface of the base substrate, the first end extends into an opening region defined by the first bent part, and an orthographic projection of the second via hole structure on the base substrate is at least partially overlapped with an orthographic projection of the first end on the base substrate.

For example, in the display panel provided by at least one embodiment of the present disclosure, the first bent part comprises a first sub bent part extending along the second direction and a second sub bent part extending along the first direction to a side close to the second common electrode bus line, an extending direction of the second common electrode bus line is parallel to the second direction, and an orthographic projection of the first sub bent part on the base substrate and the orthographic projection of the first via hole structure on the base substrate have an overlapping part, and an orthographic projection of the second sub bent part on the base substrate and the orthographic projection of the first via hole structure on the base substrate have an overlapping part.

For example, in the display panel provided by at least one embodiment of the present disclosure, the first bent part comprises a first sub bent part extending along the second direction and a second sub bent part extending along the first direction to a side close to the second common electrode bus line, an extending direction of the second common electrode bus line is parallel to the second direction, and an orthographic projection of the first sub bent part on the base substrate and the orthographic projection of the first via hole structure on the base substrate have an overlapping part, and an orthographic projection of the second sub bent part on the base substrate is not overlapped with the orthographic projection of the first via hole structure on the base substrate.

For example, in the display panel provided by at least one embodiment of the present disclosure, the first bent part comprises a first sub bent part extending along the second direction and a second sub bent part extending along the first direction to a side close to the second common electrode bus line, an extending direction of the second common electrode bus line is parallel to the second direction, and an orthographic projection of the first sub bent part on the base substrate is not overlapped with the orthographic projection of the first via hole structure on the base substrate, and an orthographic projection of the second sub bent part on the base substrate and the orthographic projection of the first via hole structure on the base substrate have an overlapping part.

For example, in the display panel provided by at least one embodiment of the present disclosure, on the plane parallel to the main surface of the base substrate, the branch part further comprises a second bent part away from the display region, and the second bent part comprises a third sub bent part extending in the second direction and a fourth sub bent part extending in the first direction, and the second sub bent part and the fourth sub bent part are connected to make an overall shape of the first bent part and the second bent part form a "U" shape, and the second common electrode bus line extends into an opening of the "U" shape.

For example, in the display panel provided by at least one embodiment of the present disclosure, an orthographic projection of the third sub bent part on the base substrate and the orthographic projection of the first via hole structure on the base substrate have an overlapping part, and an orthographic projection of the fourth sub bent part on the base substrate and the orthographic projection of the first via hole structure on the base substrate have an overlapping part.

For example, in the display panel provided by at least one embodiment of the present disclosure, an orthographic projection of the third sub bent part on the base substrate and the orthographic projection of the first via hole structure on the base substrate have an overlapping part, and an orthographic projection of the fourth sub bent part on the base substrate is not overlapped with the orthographic projection of the first via hole structure on the base substrate.

For example, in the display panel provided by at least one embodiment of the present disclosure, on a plane parallel to a main surface of the base substrate, the main body part of the first common electrode bus line is arranged in a direction parallel to the first direction, a third via hole structure is arranged at the main body part, and the main body part is electrically connected with the conductive connection layer through the third via hole structure.

For example, in the display panel provided by at least one embodiment of the present disclosure, a minimum distance between the first via hole structure and the display region and a minimum distance between the second via hole structure and the display region are both greater than 500 microns.

For example, in the display panel provided by at least one embodiment of the present disclosure, a plurality of first via hole structures are provided, and a plurality of second via hole structures are provided, and a total number of the first via hole structures and the second via hole structures is greater than or equal to 150.

For example, in the display panel provided by at least one embodiment of the present disclosure, the first via hole structures and the second via hole structures are arranged in a matrix, the first direction is a row direction and the second direction is a column direction, a sum of numbers of the first via hole structures and the second via hole structures in a row along the first direction is greater than 15, and a sum of numbers of the first via hole structures and the second via hole structures in a column along the second direction is greater than 10, and the sum of the numbers of the first via hole structures and the second via hole structures in the row along the first direction is greater than the sum of the numbers of the first via hole structures and the second via hole structures in the column along the second direction.

For example, in the display panel provided by at least one embodiment of the present disclosure, the first via hole structures and the second via hole structures are arranged in a matrix, the first direction is a row direction and the second direction is a column direction, a sum of numbers of the first via hole structures and the second via hole structures in a row along the first direction is greater than 10, and a sum of numbers of the first via hole structures and the second via hole structures in a column along the second direction is greater than 15, and the sum of the numbers of the first via hole structures and the second via hole structures in the row along the first direction is smaller than the sum of the numbers of the first via hole structures and the second via hole structures in the column along the second direction.

For example, in the display panel provided by at least one embodiment of the present disclosure, maximum dimensions of the first via hole structure and the second via hole structure on the main plane parallel to the base substrate range from 4 microns to 6 microns respectively.

For example, the display panel provided by at least one embodiment of the present disclosure, further comprises: a thin film transistor and a first electrode arranged on the base substrate and in the display region, wherein the thin film transistor comprises a gate electrode, an active layer and a source-drain electrode layer which are stacked, the source-drain electrode layer comprises a source electrode and a drain electrode which are arranged oppositely, the first common electrode bus line and the gate electrode are arranged in the same layer, and the second common electrode bus line, the source electrode and the drain electrode are arranged in the same layer, the conductive connection layer and the first electrode are arranged in the same layer and spaced apart from each other, and the first electrode is connected with the drain electrode through a fourth via hole structure.

For example, in the display panel provided by at least one embodiment of the present disclosure, a gate insulating layer is arranged at a side of the gate electrode away from the base substrate, and a passivation layer is arranged at a side of the source-drain electrode layer away from the base substrate, and the first via hole structure sequentially penetrates the passivation layer and the gate insulating layer, and both the second via hole structure and the fourth via hole structure penetrate the passivation layer.

For example, in the display panel provided by at least one embodiment of the present disclosure, on a plane parallel to a main surface of the base substrate, and in one of the display panel, two second common electrode bus lines are arranged, and the two second common electrode bus lines are oppositely arranged at both sides of the main body part of the first common electrode bus line in the first direction; the display panel further comprises a third common electrode bus line arranged opposite to the first common electrode bus line in the second direction, the third common electrode bus line is parallel to the main body part of the first common electrode bus line, and the third common electrode bus line and the first common electrode bus line are arranged in the same layer, and the two second common electrode bus lines, the first common electrode bus line and the third common electrode bus line are arranged around the display region;

the two second common electrode bus lines respectively comprise a second end and a third end which are away from the first common electrode bus line in the first direction, and the conductive connection layer is electrically connected with the second end and the third end through a fifth via hole structure; the third common electrode bus line comprises a fourth end opposite to the second end and a fifth end opposite to the third end, and the conductive connection layer is electrically connected with the fourth end and the fifth end through a sixth via hole structure.

For example, in the display panel provided by at least one embodiment of the present disclosure, a part of the third common electrode bus line between the fourth end and the fifth end is electrically connected with the conductive connection layer through a seventh via hole structure.

At least one embodiment of the present disclosure further provides a display device, and the display device comprises any one of the display panels in the above mentioned embodiments.

BRIEF DESCRIPTION OF DRAWINGS

In order to illustrate the technical solutions of the embodiments of the present disclosure clearer, the drawings of the embodiments will be briefly described. Obviously, the drawings in the following only relate to some embodiments of the present disclosure, and are not intended to limit the present disclosure.

DETAILED DESCRIPTION

Figure 1:
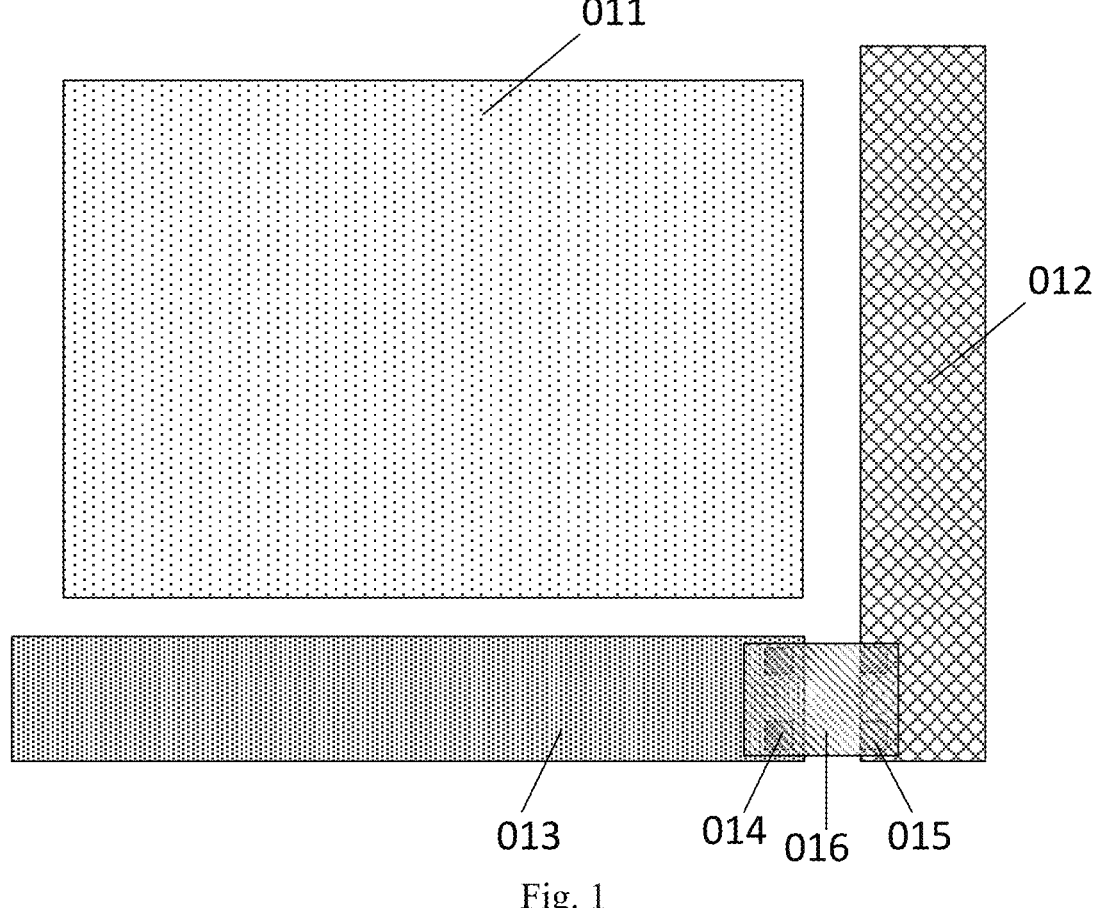
FIG. 1 is a schematic plan view of a display panel.

In order to make the purpose, technical scheme and advantages of the embodiment of the disclosure clearer, the technical scheme of the embodiment of the present disclosure will be described clearly and completely with the attached drawings. Obviously, the described embodiment is a part of the embodiment of the present disclosure, not the whole embodiment. Based on the described embodiments of the present disclosure, all other embodiments obtained by ordinary people in the field without creative labor belong to the scope of protection of the present disclosure.

Unless otherwise defined, technical terms or scientific terms used in the present disclosure shall have their ordinary meanings as understood by people with ordinary skills in the field to which the present disclosure belongs. The terms "first", "second" and the like used in the present disclosure do not indicate any order, quantity or importance, but are only used to distinguish different components. Similar words such as "including" or "containing" mean that the elements or objects appearing before the word cover the elements or objects listed after the word and their equivalents, without excluding other elements or objects. Similar words such as "connected" or "connected" are not limited to physical or mechanical connection, but can include electrical connection, whether direct or indirect. "Up", "Down", "Left" and "Right" are only used to indicate the relative positional relationship. When the absolute position of the described object changes, the relative positional relationship may also change accordingly.

With the continuous development of flat panel display technology, display devices have been successfully applied to notebook computers, monitors, televisions, advertising screens and other display devices. Thin film transistor display is a kind of various displays, and each pixel dot on the thin film transistor display is driven by a field-effect thin film transistor integrated behind the pixel dot, so that the information of a high-brightness and high-contrast display screen can be obtained. Because GOA driving circuit can replace Gate Chip On Film (Gate COF), and the manufacturing cost of the GOA driving circuit is lower than that of the Gate COF, so that the use of the GOA driving circuit can save the production cost, and the display device can be mass-produced and used in the display field on the basis of reducing the production cost.

For example, a display panel usually includes a plurality of electronic components, which include thin film transistors, signal lines, electrode patterns, and the like. The structures of these electronic components will be distributed in different layer structures. In the actual manufacturing process of the display panel, based on the requirements of wiring design and layout arrangement, it is often necessary to electrically connect conductive patterns located in different layers to meet the needs of products.

For example, in the design scheme of a display panel, for example, in a large-size display panel, such as a television, a notebook computer, a monitor, an advertising screen, etc., the conductive patterns in different layers are usually connected with an electrical connection layer through a plurality of via hole structures, that is, two conductive patterns in different layers are electrically connected with the electrical connection layer through corresponding via hole structures, so as to realize the electrical connection between the conductive patterns in different layers. Display panels are also widely used in small-size display panels such as e-sports displays. With the continuous expansion of the e-sports market, similar to large-size display panels, two conductive patterns located in different layers in a small-size display panel are also electrically connected with an electrical connection layers through corresponding via hole structures. Professional e-sports displays have higher and higher demand for game products with ultra-high refresh frequency, and the refresh frequency has developed from 60 Hz to 120 Hz, 144 Hz, 165 Hz, 240 Hz or 480 Hz.

The inventor(s) of the present disclosure have noticed that, in the current large and medium-sized display panels and small-sized display panels, the resistance at the junction of the electrical connection layer and the conductive pattern is relatively large, that is, the resistance at the via hole structure is relatively large, and the current withstand value is relatively small. On the premise that the current is the same, the more heat dissipated at the via hole structure, the higher the heat generated. Especially in the liquid crystal display panel, not only the resistance at the via hole structure is large, but also the via hole structure is close to the display region, which will increase the temperature of the liquid crystal layer in the display region. When the temperature of the liquid crystal layer exceeds the clear point of liquid crystal molecules, it will make the liquid crystal layer transparent, which will affect the display of the display region and make the formed display image bad. It should be noted that the above display region refers to a region corresponding to effective pixels. In some embodiments, the pixels of the display panel include effective pixels and dummy pixel, and the display region is a region corresponding to the effective pixels. The distance between the via hole structure and the display region refers to the minimum distance between the via hole structure and the effective pixels. In some cases, the via hole structure is easily burned, which leads to the decrease of the product yield of the liquid crystal display panel and the shorter lifespan of the liquid crystal display panel. For example, FIG. 1 is a schematic plan view of a display panel. As illustrated by FIG. 1, a vertical common electrode bus line 012 is arranged at a right side of a display region 011, and a horizontal common electrode bus line 013 is arranged below the display region 011. A first via hole 014 is arranged above the horizontal common electrode bus line 013, a second via hole 015 is arranged above the vertical common electrode bus line 012, and a conductive connection layer 016 is arranged above the first via hole 014 and the second via hole 015. The conductive connection layer 016 is electrically connected with the horizontal common electrode bus line 013 through the first via hole 014, and the conductive connection layer 016 is electrically connected with the vertical common electrode bus line 012 through the second via hole 015, so that the horizontal common electrode bus line 013 and the vertical common electrode bus line 012 are electrically connected. However, in the structure shown in FIG. 1, the directly facing region of the vertical common electrode bus line 012 and the horizontal common electrode bus line 013 is relatively small. Therefore, the region where the first via hole 014 and the second via hole 015 can be arranged is relatively smaller, so that the total number of the first via hole 014 and the second via hole 015 is relatively small, so that there are few parallel circuits, and the resistance in the whole circuit is larger, so that more heat is released at the first via hole 014 and the second via hole 015, which easily leads to the problems that the first via hole 014 and the second via hole 015 are burned out, the product yield of the display panel is reduced, and the lifespan of the display panel is relatively short. In the case that the display panel is a liquid crystal display panel, the first via hole 014 and the second via hole 015 are close to the display region 011, and it is easy to occur the problem that the temperature of the liquid crystal layer in the display region 011 of the liquid crystal display panel rises to reach the clear point of the liquid crystal due to the heat radiated from the first via hole 014 and the second via hole 015. Therefore, it can be considered that the number of the first via hole 014 and the number of the second via hole 015 are provided more, and the first via hole 014 and the second via hole 015 are arranged away from the display region 011, so as to reduce the influence of heat emitted by the first via hole 014 and the second via hole 015 on the display region 011.

At least one embodiment of the present disclosure provides a display panel, which includes a base substrate, and a first common electrode bus line, a second common electrode bus line and a conductive connection layer which are stacked on the base substrate. The base substrate includes a display region and a peripheral region surrounding the display region, and the first common electrode bus line includes a main body part and a branch part extending from an end of the main body part to a side away from the display region, the main body part extends along a first direction, and at least a part of the branch part connected with the main body part extends along a second direction, and the first direction intersects with the second direction. The second common electrode bus line extends along the second direction to a side away from the display region, and a first end of the second common electrode bus line directly faces the end of the main part and the branch part. In the peripheral region, the conductive connection layer is connected with the branch part of the first common electrode bus line through a first via hole structure, and the conductive connection layer is electrically connected with the first end of the second common electrode bus line through a second via hole structure. The structural design of the display panel can increase the number of the first via hole structure and the number of the second via hole structure, and reduce the resistance in the circuit structure, so as to avoid the problems that the first via hole structure and the second via hole structure are burned out, which leads to the reduction of the product yield of the display panel and the short lifespan of the display panel. Moreover, in the case that the display panel is a liquid crystal display panel, the first via hole structure and the second via hole structure are arranged away from the display region, and the problem that the temperature of the liquid crystal layer in the display region of the liquid crystal display panel is raised to reach the clear point of liquid crystal by the heat radiated from the first via hole structure and the second via hole structure can be avoided.

Figure 2:
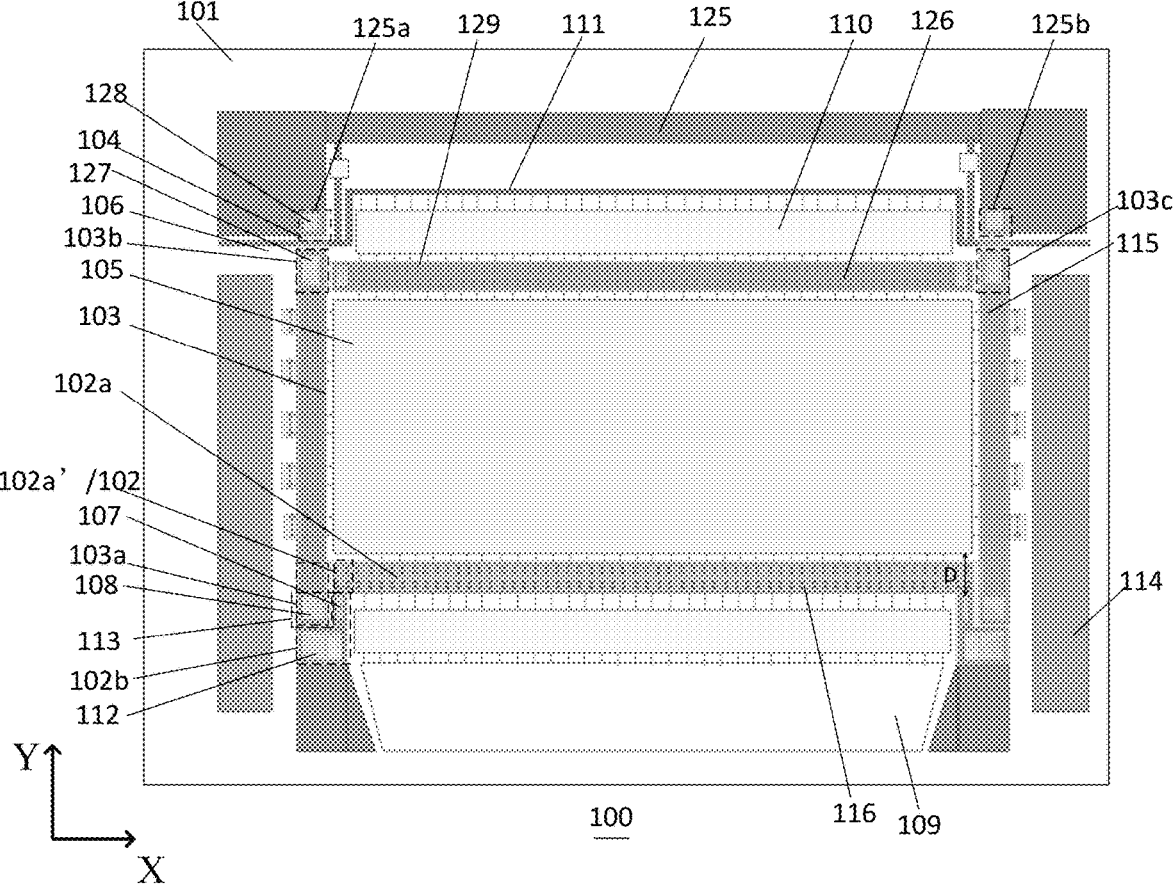
FIG. 2 is a schematic plan view of a display panel provided by at least one embodiment of the present disclosure.

For example, FIG. 2 is a schematic plan view of a display panel provided by at least one embodiment of the present disclosure. The display panel 100 includes a base substrate 101 and a first common electrode bus line 102, a second common electrode bus line 103 and a conductive connection layer 104 which are stacked on the base substrate 101. The base substrate 101 includes a display region 105 and a peripheral region 106 surrounding the display region 105, and the first common electrode bus line 102 includes a main body part 102a and a branch part 102b extending from an end 102a' of the main body part to a side away from the display region 105. For example, the main body part 102a extends along a first direction X, and the branch part 102b at least includes a strip-shaped part, and at least a part of the branch part 102b connected with the main body part 102a extends along a second direction Y, and the first direction X intersects with the second direction Y.

For example, in one example, as illustrated by FIG. 2, the branch part 102b includes two parts, the two parts form a step shape, a first end 103a of the second common electrode bus line 103 extends to face a lateral platform of the step shape, and the part of the branch part 102b connected with the main body part 102a extends along the second direction Y to form a vertical part of the step shape. Of course, the embodiment of the present disclosure is not limited thereto, and it is also possible that the branch part 102b only includes a strip-shaped part connected with the main body part 102a and extending along the second direction Y, or it may also include a plurality of stepped portions.

For example, in one example, as illustrated by FIG. 2, the second common electrode bus line 103 extends along the second direction Y to a side away from the display region 105, and the first end 103a of the second common electrode bus line 103 directly faces an end 102a' of the main body part and the branch part 102b. In the peripheral region 106, the conductive connection layer 104 is connected with the branch part 102b of the first common electrode bus line 102 through first via hole structures 107, and the conductive connection layer 104 is electrically connected with the first end 103a of the second common electrode bus line 103 through second via hole structures 108. For example, the second via hole structures 108 are only provided at the position of the first end 103a corresponding to the branch part 102b. It should be noted that the position of the first end 103a corresponding to the end 102a' of the main body part is also provided with a via hole structure, and the size, shape, distribution density and the like of the via hole structure at this position may be different from that of the second via hole structures 108. For example, the maximum size of the via hole structure at the position of the first end 103a corresponding to the end 102a' of the main body part on a plane parallel to the main surface of the base substrate 101 is larger than that of the second via hole structure 108, and the distribution density of the via hole structure is smaller than that of the second via hole structure 108.

For example, in the structure shown in FIG. 2, the display panel 100 further includes a third common electrode bus line 126 arranged opposite to the first common electrode bus line 102 in the second direction Y, the third common electrode bus line 126 is parallel to the main body part 102a of the first common electrode bus line 102, and is arranged in the same layer as the first common electrode bus line 102. The second common electrode bus lines 103 are arranged at the left and right sides of the first common electrode bus line 102 and the third common electrode bus line 126, the first common electrode bus line 102, the third common electrode bus line 126 and two second common electrode bus lines 103 are all located in the peripheral region 106. The two second common electrode bus lines 103, the first common electrode bus line 102 and the third common electrode bus line 126 surround the display region 105 to form a structure surrounding the display region 105. At a side of the third common electrode bus line 126 away from the display region 105, and along the direction from a position close to the display region 105 to a position away from the display region 105, an anti-static structure 110 and an electrostatic lead wire 111 are sequentially arranged.

For example, as illustrated by FIG. 2, the anti-static structure 110 and a fan-out region 109 are sequentially arranged at a side of the first common electrode bus line 102 away from the display region 105, and along the direction from a position close to the display region 105 to a position away from the display region 105, and the fan-out region 109 is configured to apply touch signals and/or display signals to the display region. For example, only the two ends 102a' of the main body part of the first common electrode bus line 102 are provided with branch parts 107 extending to the side away from the display region 105. Each of the branch parts 107 is a collection place of current, and the heat generated there is very large, so it is required to arrange the branch parts 107 away from the display region 105. No branch part 107 is provided at the end of the third common electrode bus line 126.

For example, as illustrated by FIG. 2, a gate driving circuit 114 is provided at a side of the left second common electrode bus line 103 away from the display region 105, and a gate driving circuit 114 is also provided at a side of the right second common electrode bus line 103 away from the display region 105, the gate driving circuit 114 can apply scanning signals to the gate lines. The display panel 100 further includes a common electrode line 115 extending from the display region 105, and the common electrode line 115 is electrically connected with the second common electrode bus line 103 and the conductive connection layer 104.

For example, the structural design of the display panel 100 can set the branch parts 107 to be further away from the display region 105, so that a larger region on the branch parts 107 can be provided with more via hole structures, and the number of the first via hole structures 107 and the second via hole structures 108 can be increased to reduce the resistance in the circuit structure, so as to prevent the first via hole structures 107 and the second via hole structures 108 from burning out, which will lead to the reduction of the product yield of the display panel 100 and the short lifespan of the display panel. Moreover, in the case that the display panel is a liquid crystal display panel, by arranging the first via hole structures 107 and the second via hole structures 108 away from the display region 105, the display panel can also avoid the problem that the temperature of the liquid crystal layer in the display region of the liquid crystal display panel rises to reach the clear point of the liquid crystal due to the heat radiated from the first via hole structures 107 and the second via hole structures 108.

For example, as illustrated by FIG. 2, the minimum distance between the first via hole structures 107 and the display region 105, and the minimum distance between the second via hole structures 108 and the display region 105 are greater than 500 microns. In some examples, the minimum distance between the first via hole structures 107 and the display region 105 may be equal to the minimum distance between the second via hole structures 108 and the display region 105, or the minimum distance between the first via hole structures 107 and the display region 105 may be greater than the minimum distance between the second via hole structure 108 and the display region 105, or the minimum distance between the first via hole structure 107 and the display region 105 may be smaller than the minimum distance between the second via hole structure 108 and the display region 105. In the structure shown in FIG. 2, the minimum distance D between the first via hole structures 107 and the display region 105 is smaller than the minimum distance between the second via hole structures 108 and the display region 105, and the minimum distance D between the first via hole structures 107 and the display region 105 is larger than 500 microns. The setting of this distance can prevent the temperature of the liquid crystal layer in the display region of the liquid crystal display panel from rising to reach the clear point of the liquid crystal due to the heat radiated from the first via hole structures 107 and the second via hole structures 108, so as to avoid the reduction of the the display quality.

For example, as illustrated by FIG. 2, on a plane parallel to the main surface of the base substrate 101, each of the branch parts 107 at least includes a first bent part 112 away from the display region 105, and an orthographic projection of the first via hole structure 107 on the base substrate 101 is at least partially overlapped with an orthographic projection of the first bent part 112 on the base substrate 101. In the structure shown in FIG. 2, the overall structure of the branch part 107 is the first bent part 112, and other structures are not included. Of course, the branch part 107 can also include other structures, for example, the branch part 107 can also include more bent parts or strip-shaped parts extending from the first bent part 112 to the side away from the display region 105, and the embodiment of the present disclosure is not limited thereto.

For example, as illustrated by FIG. 2, on the plane parallel to the main surface of the base substrate 101, the first end 103*a* extends into an opening region 113 defined by the first bent part 112, and an orthographic projection of the second via hole structure 108 on the base substrate 101 is at least partially overlapped with an orthographic projection of the first end 103*a* on the base substrate 101, that is, the orthographic projection of the first end 103*a* on the base substrate 101 can be overlapped with the orthographic projections of all the second via hole structures 108 on the base substrate, or overlapped with the orthographic projections of a part of the second via hole structures 108 on the base substrate.

For example, as illustrated by FIG. 2, on a plane parallel to the main surface of the base substrate 101, the main body part 102*a* of the first common electrode bus line 102 is arranged in a direction parallel to the first direction X, that is, the main body part 102*a* of the first common electrode bus line 102 extends in a transverse direction in FIG. 2. A plurality of third via hole structures 116 are arranged on the main body part 102*a*, and the main body part 102*a* is electrically connected with the conductive connection layer 104 through the third via hole structures 116.

It should be noted that the main body part 102*a* has a plurality of parallel branches. Although the third via hole structures 116 are close to the display region 105, the resistances of the parallel branches are very small, and the current is not concentrated here, so the generated heat is very small, which will not affect the display of the display region.

Figure 3:
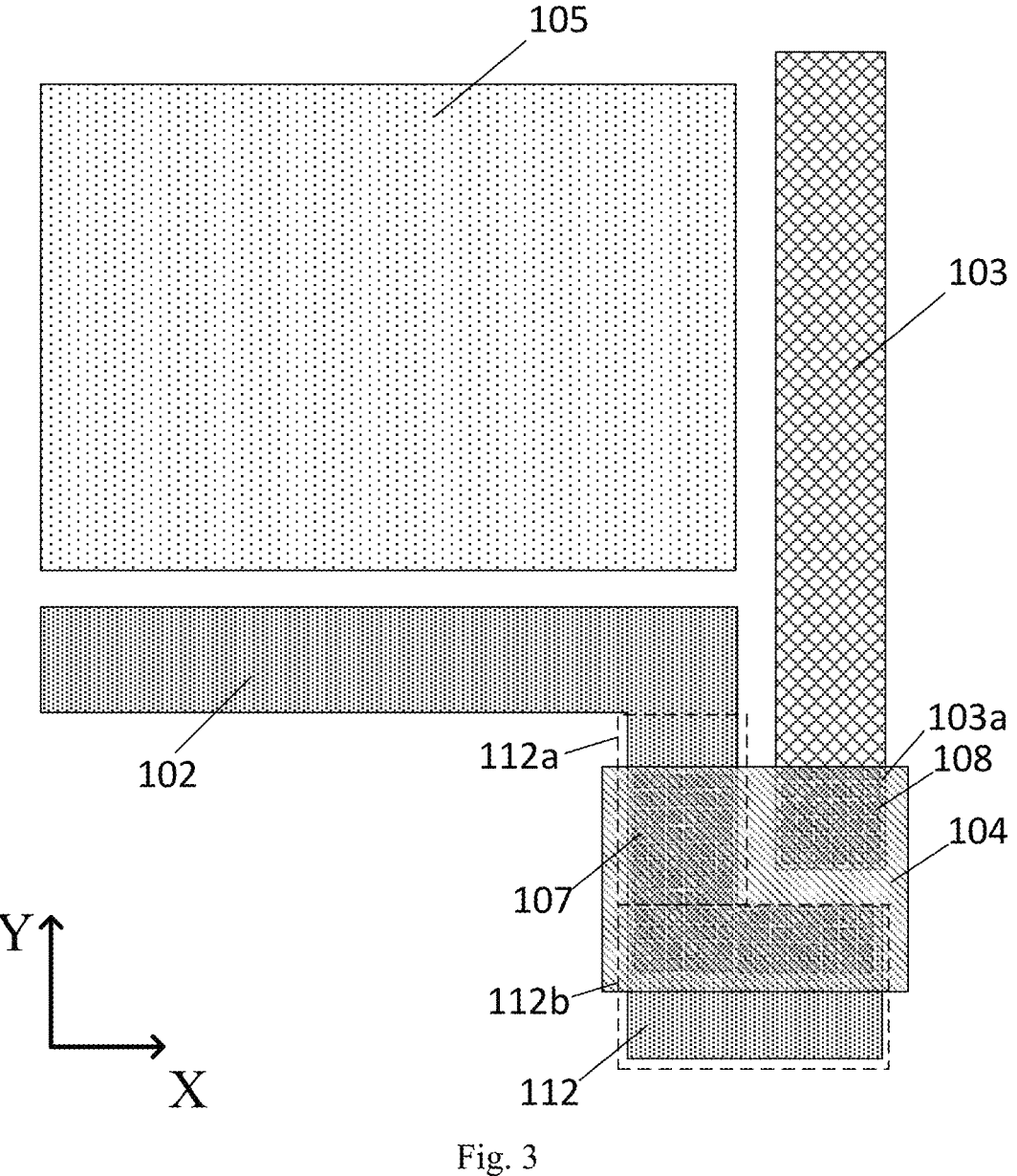
FIG. 3 is an enlarged schematic plan view of a first bent part provided by at least one embodiment of the present disclosure.

For example, FIG. 3 is an enlarged schematic plan view of a first bent part provided by at least one embodiment of the present disclosure. As illustrated by FIG. 3, the first bent part 112 includes a first sub bent part 112*a* extending along the second direction Y and a second sub bent part 112*b* extending along the first direction X to a side close to the second common electrode bus line 103. The overall plan shape formed by the first sub bent part 112*a* and the second sub bent part 112*b* is an "L" shape. An extending direction of the second common electrode bus line 103 is parallel to the second direction Y, and an orthographic projection of the first sub bent part 112*a* on the base substrate and orthographic projections of the first via hole structures 107 on the base substrate 101 have an overlapping part, and an orthographic projection of the second sub bent part 112*b* on the base substrate and orthographic projections of the first via hole structures 107 on the base substrate 101 have an overlapping part, and the overall shape of the arrangement of the first via hole structures 107 is also an "L" shape. In the structure shown in FIG. 3, an orthographic projection of a part of the first sub bent part 112*a* on the base substrate is overlapped with orthographic projections of the first via hole structures 107 on the base substrate 101, and an orthographic projection of a part of the second sub bent part 112*b* on the base substrate is overlapped with orthographic projections of the first via hole structures 107 on the base substrate. An orthographic projection of a part of the first end 103*a* on the base substrate 101 is overlapped with orthographic projections of the second via hole structures 108 on the base substrate 101. The structure of the first bent part 112 is simple, and can meet the number requirements of the first via hole structures 107 and the second via hole structures

108, so that the process is simple. In addition, this design can also make that both the first sub bent part 112*a* and the second sub bent part 112*b* include the first via hole structures 107, so that the first via hole structures 107 corresponding to the second via hole structures 108 are distributed as evenly as possible, so as to make the connection between the second common electrode bus line 103 and the first common electrode bus line 102 more stable.

For example, although in the structure shown in FIG. 3, an orthographic projection of the conductive connection layer 104 on the base substrate 101 is overlapped with an orthographic projection of a part of the second common electrode bus line 103 on the base substrate 101, in the actual product, the conductive connection layer 104 is arranged around the display region 105. That is, an orthographic projection of the conductive connection layer 104 on the base substrate 101 covers an orthographic projection of the first common electrode bus line 102 on the base substrate 101, an orthographic projection of the third common electrode bus line 126 on the base substrate 101 and orthographic projections of the two second common electrode bus lines 103 on the base substrate 101.

Figure 4:
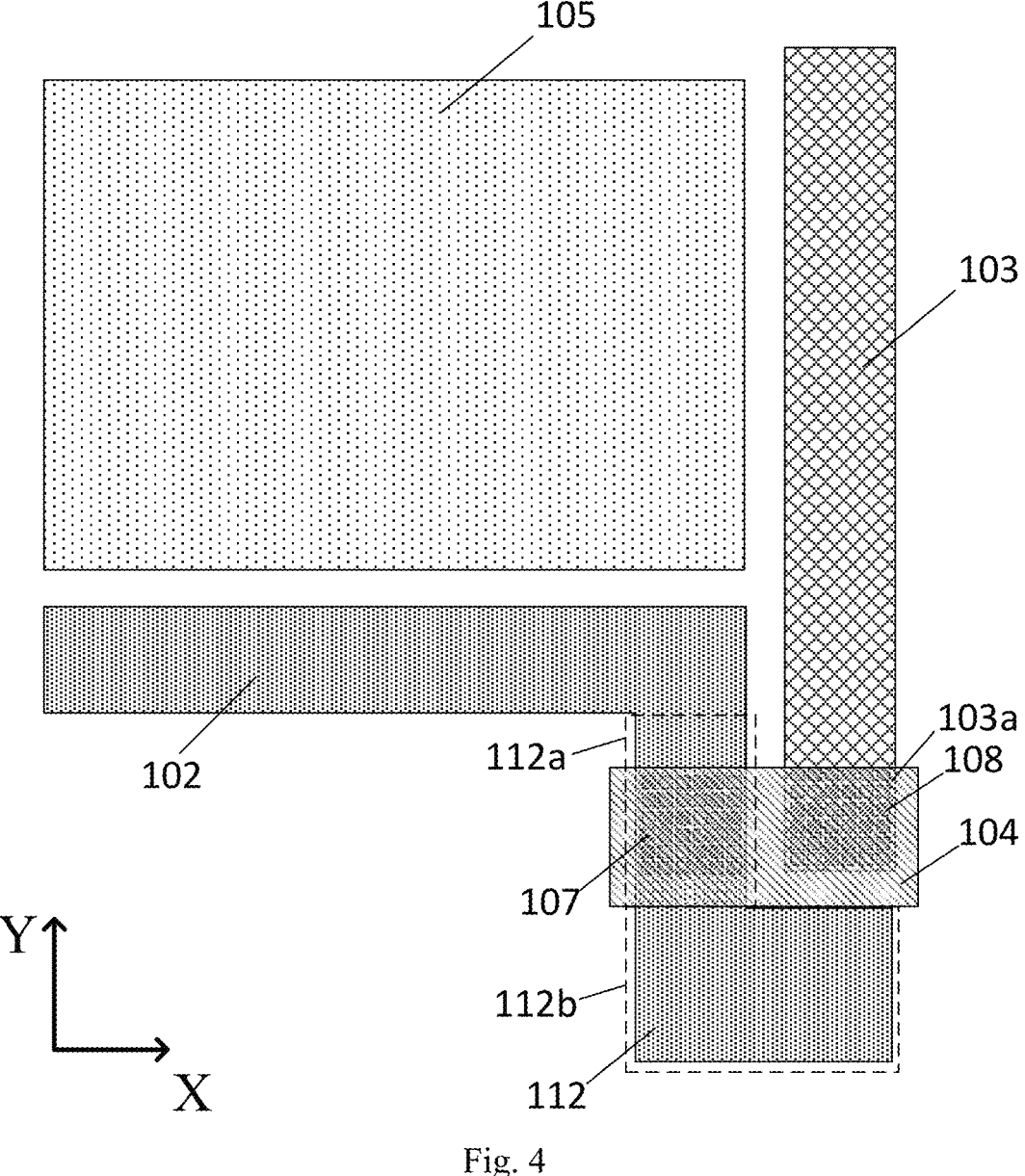
FIG. 4 is an enlarged schematic plan view of another first bent part provided by at least one embodiment of the present disclosure.

For example, FIG. 4 is an enlarged schematic plan view of another first bent part provided by at least one embodiment of the present disclosure. As illustrated by FIG. 4, the first bent part 112 includes a first sub bent part 112*a* extending along the second direction Y and a second sub bent part 112*b* extending along the first direction X to a side close to the second common electrode bus line 103. The overall plan shape formed by the first sub bent part 112*a* and the second sub bent part 112*b* is an "L" shape. An extending direction of the second common electrode bus line 103 is parallel to the second direction Y. An orthographic projection of the first sub bent part 112*a* on the base substrate and orthographic projections of the first via hole structures 107 on the base substrate 101 have an overlapping part, and an orthographic projection of the second sub bent part 112*b* on the base substrate 101 is not overlapped with orthographic projections of the first via hole structures 107 on the base substrate 101. The overall shape of the arrangement of the first via hole structures 107 is also a linear shape. The linear shape of the first via hole structures 107 directly faces the linear shape of the second via hole structures 108. The linear shape of the first via hole structures 107 and the linear shape of the second via hole structures 108 can not only meet the number requirements of the first via hole structures 107 and the second via hole structures 108, but also simplify the process of forming the first via hole structures 107, and make the width of the second sub bent part 112*b* as small as possible in the second direction Y, thus reducing the width of a lower frame and making the width of the lower frame narrower.

For example, although in the structure shown in FIG. 4, an orthographic projection of the conductive connection layer 104 on the base substrate 101 is overlapped with an orthographic projection of a part of the second common electrode bus line 103 on the base substrate 101, in the actual product, the conductive connection layer 104 is arranged around the display region 105. That is, the orthographic projection of the conductive connection layer 104 on the base substrate 101 covers an orthographic projection of the first common electrode bus line 102 on the base substrate 101, an orthographic projection of the third common electrode bus line 126 on the base substrate 101 and orthographic projections of the two second common electrode bus lines 103 on the base substrate 101.

Figure 5:
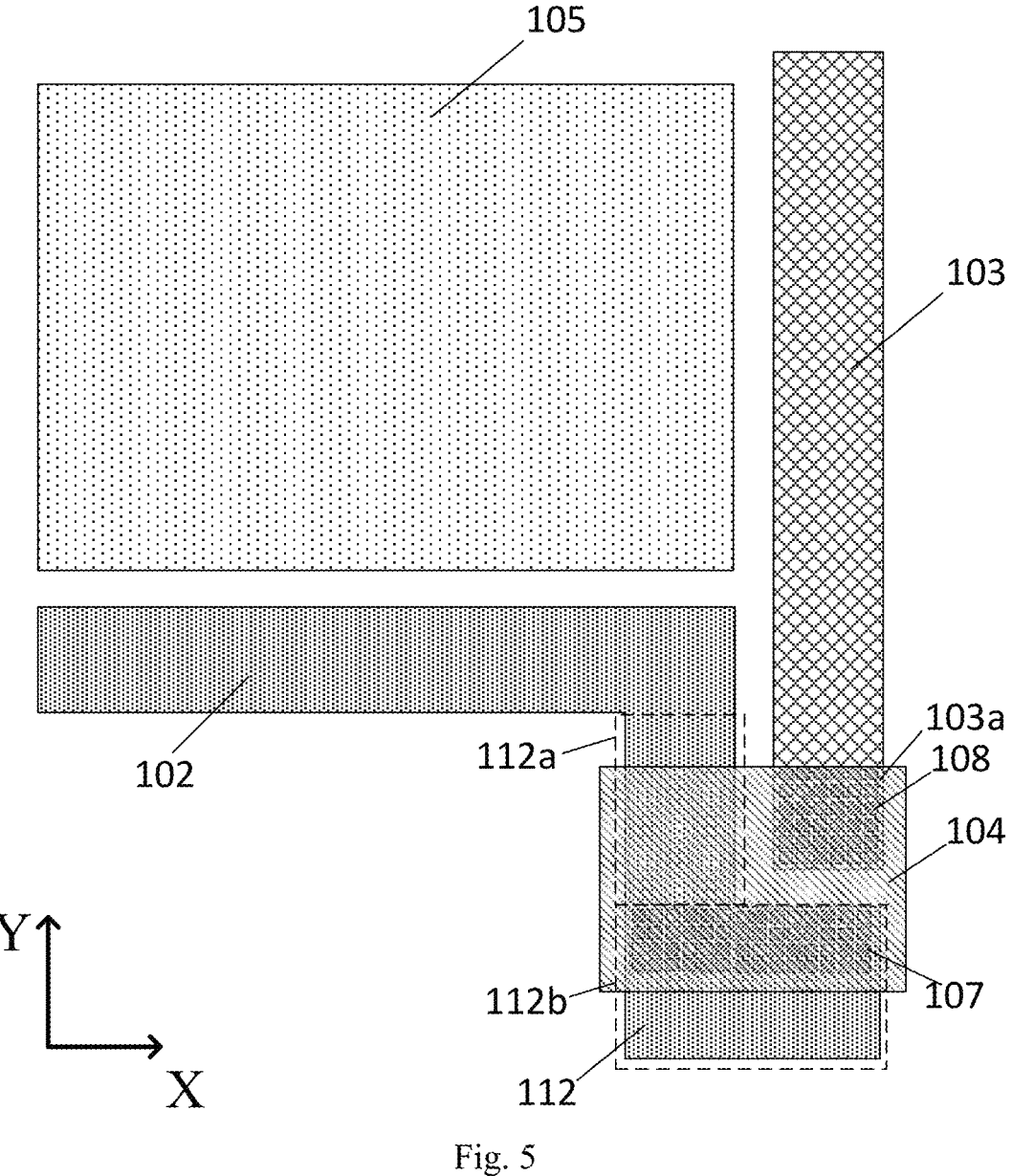
FIG. 5 is an enlarged schematic plan view of another first bent part provided by at least one embodiment of the present disclosure.

For example, FIG. 5 is an enlarged schematic plan view of another first bent part provided by at least one embodiment of the present disclosure. As illustrated by FIG. 5, the first bent part 112 includes a first sub bent part 112a extending along the second direction Y and a second sub bent part 112b extending along the first direction X to a side close to the second common electrode bus line 103. The overall plan shape formed by the first sub bent part 112a and the second sub bent part 112b is an "L" shape. An extending direction of the second common electrode bus line 103 is parallel to the second direction Y, and an orthographic projection of the first sub bent part 112a is not overlapped with orthographic projections of the first via hole structures 107 on the base substrate 101, and an orthographic projection of the second sub bent part 112b and the orthographic projections of the first via hole structures 107 on the base substrate 101 have an overlapping part. The structure of the first bent part 112 is simple, and makes the technological process simple on the premise that the number requirements of the first via hole structures 107 and the second via hole structures 108 are satisfied. In addition, this design can also make only the second sub bent part 112b involve the first via hole structures 107, so that the distance between the first via hole structures 107 and the display region 105 can be increased, and the influence of heat radiated from the first via hole structures 107 on the display region 105 can be reduced.

For example, although in the structure shown in FIG. 5, an orthographic projection of the conductive connection layer 104 on the base substrate 101 is overlapped with the orthographic projection of a part of the second common electrode bus line 103 on the base substrate 101, in the actual product, the conductive connection layer 104 is arranged around the display region 105. That is, the orthographic projection of the conductive connection layer 104 on the base substrate 101 covers an orthographic projection of the first common electrode bus line 102 on the base substrate, an orthographic projection of the third common electrode bus line 126 on the base substrate and orthographic projections of the two second common electrode bus lines 103 on the base substrate 101.

Figure 6:
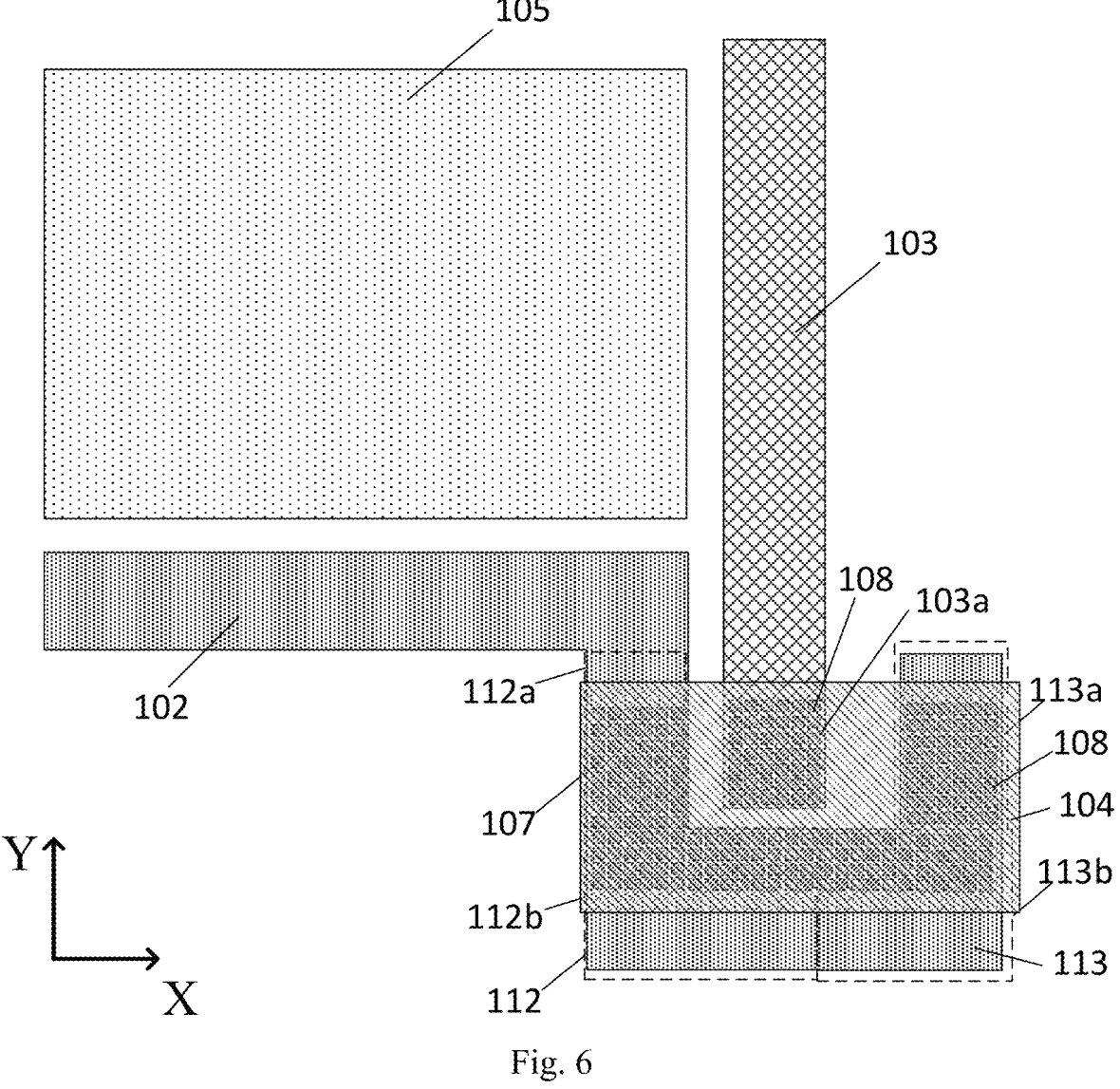
FIG. 6 is an enlarged schematic plan view of a branch part provided by at least one embodiment of the present disclosure.

For example, FIG. 6 is an enlarged schematic plan view of a branch part provided by at least one embodiment of the present disclosure. As illustrated by FIG. 6, on the plane parallel to the main surface of the base substrate 101, the branch part 107 includes a first bent part 112 away from the display region 105 and a second bent part 113 away from the display region 105. The first bent part 112 includes a first sub bent part 112a extending along the second direction Y and a second sub bent part 112b extending along the first direction X to a side close to the second common electrode bus line 103. The overall plane shape formed by the first sub bent part 112a and the second sub bent part 112b is an "L" shape. The second bent part 113 includes a third sub bent part 113a extending along the second direction Y and a fourth sub bent part 113b extending along the first direction X. The second sub bent part 112b and the fourth sub bent part 113b are connected so that the overall shape of the first bent part 112 and the second bent part 113 is a "U" shape, and an extending direction of the second common electrode bus line 103 is parallel to the second direction Y, and the second common electrode bus line 103 extends into an opening of the "U" shape. It should be noted that the edges of the second sub bent part 112b and the fourth sub bent part 113b shown in FIG. 6 are right-angled edges, although the shape of the finally formed branch part is not strictly a "U" shape, the shape of the finally formed branch part can also be equivalent to a "U" shape. In another example, the edges of the second sub bent part 112b and the fourth sub bent part 113b can also be arc edges, and a cross-sectional shape of the finally formed branch part is a "U" shape.

For example, as illustrated by FIG. 6, an orthographic projection of a part of the first sub bent part 112a is overlapped with orthographic projections of the first via hole structures 107 on the base substrate 101, and an orthographic projection of a part of the second sub bent part 112b is overlapped with the orthographic projections of the first via hole structures 107 on the base substrate 101. The orthographic projection of the third sub bent part 113a on the base substrate 101 and the orthographic projections of the first via hole structures 107 on the base substrate 101 have an overlapping part, and an orthographic projection of the fourth sub bent part 113b on the base substrate 101 and the orthographic projections of the first via hole structures 107 on the base substrate 101 have an overlapping part, so that the arrangement shape of the first via hole structures 107 is also a "U" shape, so that the connection positions between the first end 103a of the second common electrode bus line 103 and the first common electrode bus line 102 are as much as possible.

For example, as illustrated by FIG. 6, an orthographic projection of a part of the first end 103a of the second common electrode bus line 103 on the base substrate 101 is overlapped with the orthographic projections of the second via hole structures 108 on the base substrate 101. With this structure, the first via hole structures 107 are provided at the positions corresponding to the first sub bent part 112a and the third sub bent part 113a of the "U" shaped branch part. The first sub bent part 112a is electrically connected with the first end 103a of the second common electrode bus line 103 through the first via hole structures 107 and the conductive connection layer 104, and the third sub bent part 113a is electrically connected with the first end 103a of the second common electrode bus line 103 through the first via hole structures 107 and the conductive connection layer 104. In this way, the first end 103a of the second common electrode bus line 103 can be electrically connected with both the first sub bent part 112a and the third sub bent part 113a, so that more parallel circuits can be formed, and the resistance can be further reduced to reduce the dissipated heat. With this structure, the first via hole structures 107 are provided at the positions corresponding to the second sub bent part 112b and the fourth sub bent part 113b at the bottom of the "U" shape. The second sub bent part 112b is electrically connected with the first end 103a of the second common electrode bus line 103 through the first via hole structures 107 and the conductive connection layer 104, and the fourth sub bent part 113b is electrically connected with the first end 103a of the second common electrode bus line 103 through the first via hole structures 107 and the conductive connection layer 104. In this way, the first end 103a of the second common electrode bus line 103 can also be electrically connected with the second sub bent part 112b and the fourth sub bent part 113b, so that more parallel circuits can be formed, and the resistance can be further reduced to further reduce the dissipated heat.

Figure 7:
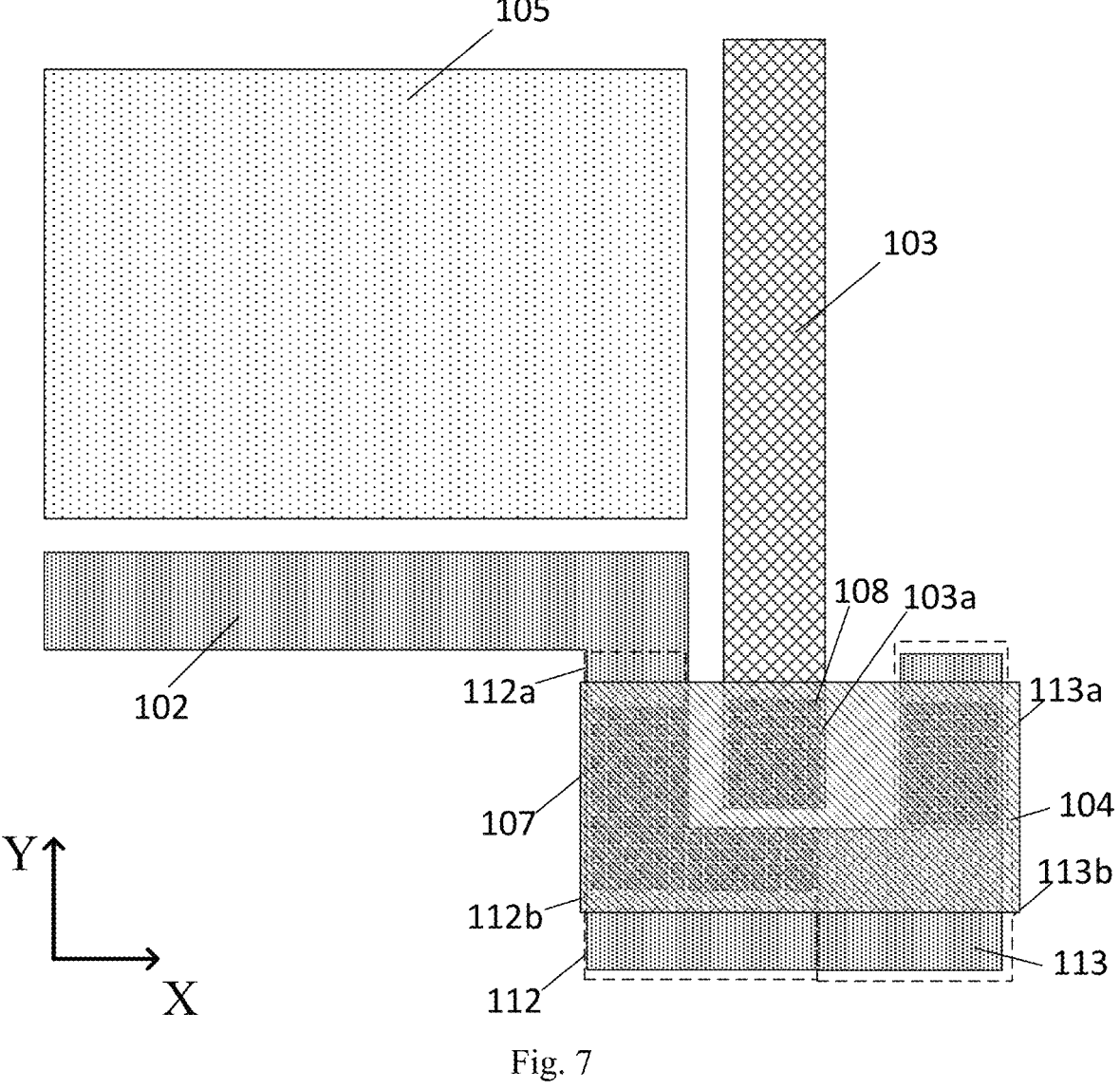
FIG. 7 is an enlarged schematic plan view of another branch part provided by at least one embodiment of the present disclosure.

For example, although in the structure shown in FIG. 6, an orthographic projection of the conductive connection layer 104 on the base substrate 101 is overlapped with an orthographic projection of a part of the second common electrode bus line 103 on the base substrate 101, in the actual product, the conductive connection layer 104 is arranged around the display region 105. That is, the orthographic projection of the conductive connection layer 104 on the base substrate 101 covers an orthographic projection of the first common electrode bus line 102 on the base substrate 101, an orthographic projection of the third common electrode bus line 126 on the base substrate 101 and orthographic projections of the two second common electrode bus lines 103 on the base substrate 101. For example, FIG. 7 is an enlarged schematic plan view of another branch part provided by at least one embodiment of the present disclosure. As illustrated by FIG. 7, an orthographic projection of a part of the first sub bent part 112*a* on the base substrate 101 is overlapped with orthographic projections of the first via hole structures 107 on the base substrate 101. An orthographic projection of a part of the second sub bent part 112*b* on the base substrate 101 is overlapped with the orthographic projections of the first via hole structures 107 on the base substrate 101, and an orthographic projection of the third sub bent part 113*a* on the base substrate 101 and the orthographic projections of the first via hole structures 107 on the base substrate 101 have an overlapping part, and an orthographic projection of the fourth sub bent part 113*b* on the base substrate 101 is not overlapped with the orthographic projections of the first via hole structures 107 on the base substrate 101. The first sub bent part 112*a* is electrically connected with the first end 103*a* of the second common electrode bus line 103 through the first via hole structures 107 and the conductive connection layer 104, and the third sub bent part 113*a* is electrically connected with the first end 103*a* of the second common electrode bus line 103 through the first via hole structures 107 and the conductive connection layer 104. In this way, the first end 103*a* of the second common electrode bus line 103 can be electrically connected with both the first sub bent part 112*a* and the third sub bent part 113*a*, so that more parallel circuits can be formed, and the resistance can be further reduced to reduce the dissipated heat. This structure enables the positions corresponding to the second sub bent part 112*b* at the bottom of the "U" shape to be provided with the first via hole structures 107. The second sub bent part 112*b* is electrically connected with the first end 103*a* of the second common electrode bus line 103 through the first via hole structures 107 and the conductive connection layer 104, but the fourth sub bent part 113*b* is not provided with the first via hole structures 107, so that the positions of the "U" shape structure directly facing the first end 103*a* of the second common electrode bus line 103 are all provided with the first via hole structures 107, furthermore, on the basis of satisfying the number requirement of the first via hole structures 107, the first via hole structures 107 are avoided to be arranged at the position that not directly faces to the first end 103*a* of the second common electrode bus line 103, namely, the fourth sub bent part 113*b*, so as to simplify the process.

For example, although in the structure shown in FIG. 7, an orthographic projection of the conductive connection layer 104 on the base substrate 101 is overlapped with an orthographic projection of a part of the second common electrode bus line 103 on the base substrate 101, in the actual product, the conductive connection layer 104 is arranged around the display region 105. That is, the orthographic projection of the conductive connection layer 104 on the base substrate 101 covers an orthographic projection of the first common electrode bus line 102 on the base substrate, an orthographic projection of the third common electrode bus line 126 on the base substrate 101 and orthographic projections of the two second common electrode bus lines 103 on the base substrate 101.

Figures 8, 9:
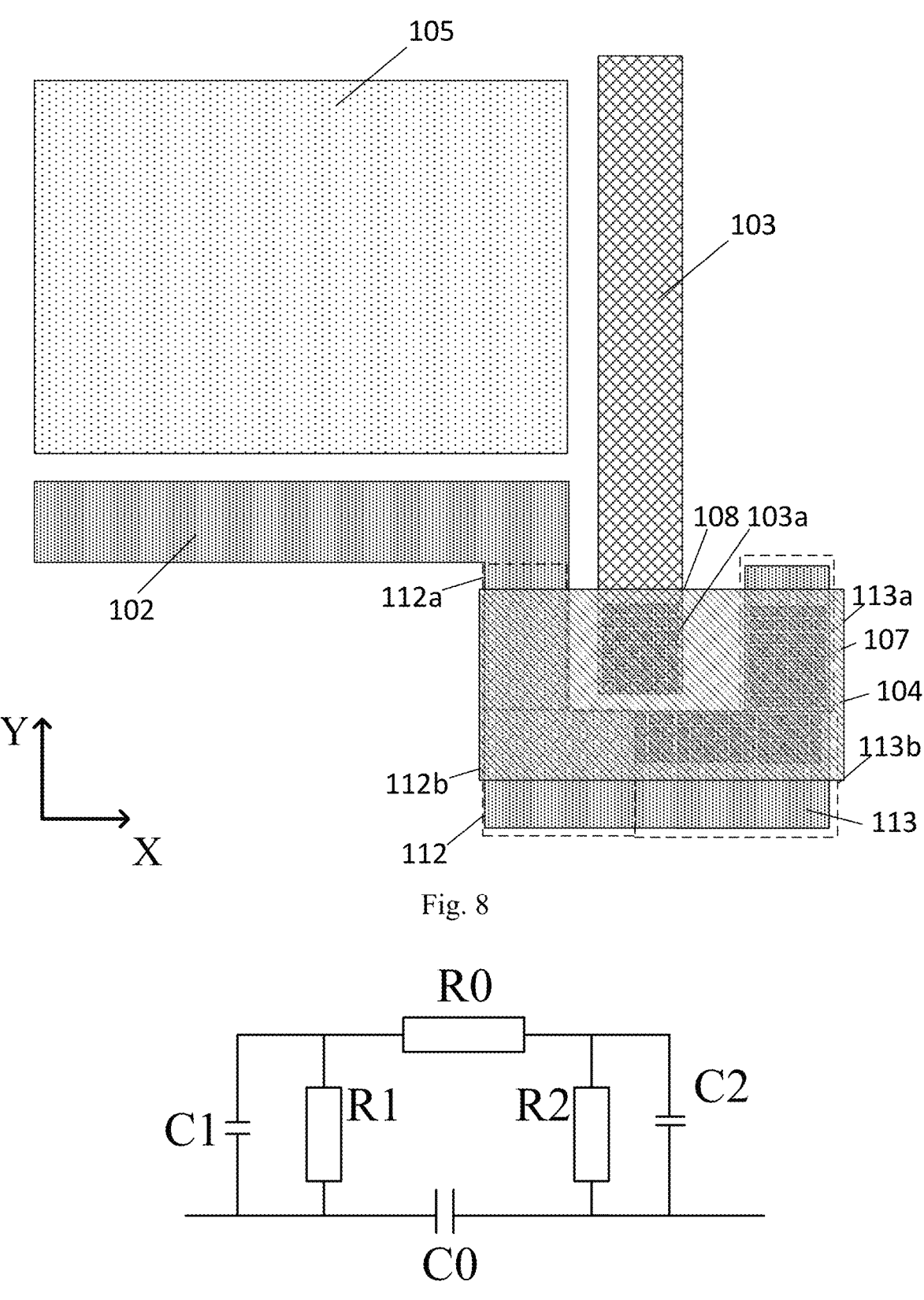
FIG. 8 is an enlarged schematic plan view of another branch part provided by at least one embodiment of the present disclosure.
FIG. 9 is a circuit diagram of a first via hole structure and a second via hole structure provided by at least one embodiment of the present disclosure.

For example, FIG. 8 is an enlarged schematic plan view of another branch part provided by at least one embodiment of the present disclosure, as illustrated by FIG. 8, an orthographic projection of a part of the first sub bent part 112*a* on the base substrate 101 is not overlapped with orthographic projections of the first via hole structures 107 on the base substrate 101. An orthographic projection of the second sub bent part 112*b* on the base substrate 101 is not overlapped with the orthographic projections of the first via hole structures 107 on the base substrate 101, an orthographic projection of the third sub bent part 113*a* on the base substrate 101 and the orthographic projections of the first via hole structures 107 on the base substrate 101 have an overlapping part, and an orthographic projection of the fourth sub bent part 113*b* on the base substrate 101 and the orthographic projections of the first via hole structures 107 on the base substrate 101 have an overlapping part. The third sub bent part 113*a* is electrically connected with the first end 103*a* of the second common electrode bus line 103 through the first via hole structures 107 and the conductive connection layer 104, and the fourth sub bent part 113*b* is electrically connected with the first end 103*a* of the second common electrode bus line 103 through the first via hole structures 107 and the conductive connection layer 104. In this way, the first end 103*a* of the second common electrode bus line 103 can be electrically connected with both the third sub bent part 113*a* and the fourth sub bent part 113*b*, so that more parallel circuits are formed, the resistance can be further reduced, and the dissipated heat can be reduced, and the third sub bent part 113*a* and the fourth sub bent part 113*b* are farther away from the display region 105. The arrangement of the first via hole structures 107 on the third sub bent part 113*a* and the fourth sub bent part 113*b* can further reduce the influence of heat radiated from the first via hole structure 107 on the display region 105.

For example, although in the structure shown in FIG. 8, the orthographic projection of the conductive connection layer 104 on the base substrate 101 is overlapped with the orthographic projection of a part of the second common electrode bus line 103 on the base substrate 101, in the actual product, the conductive connection layer 104 is arranged around the display region 105. That is, the orthographic projection of the conductive connection layer 104 on the base substrate 101 covers an orthographic projection of the first common electrode bus line 102 on the base substrate 101, an orthographic projection of the third common electrode bus line 126 on the base substrate 101 and the orthographic projections of the two second common electrode bus lines 103 on the base substrate 101.

It should be noted that, in other examples, the orthographic projection of a part of the first sub bent part 112*a* on the base substrate 101 and the orthographic projections of the first via hole structures 107 on the base substrate 101 may have an overlapping portion, while the orthographic projection of a part of the second sub bent part 112*b* on the base substrate 101 is not overlapped with the orthographic projections of the first via hole structures 107 on the base substrate 101, the orthographic projection of the third sub bent part 113*a* on the base substrate 101 and the orthographic projections of the first via hole structures 107 on the base substrate 101 have an overlapping part, and the orthographic projection of the fourth sub bent part 113*b* on the base substrate 101 is not overlapped with the orthographic projections of the first via hole structures 107 on the base substrate 101. It is also possible that the orthographic projection of a part of the first sub bent part 112*a* on the base substrate 101 is not overlapped with the orthographic projections of the first via hole structures 107 on the base substrate 101, but the orthographic projection of a part of the second sub bent part 112*b* on the base substrate 101 and the orthographic projections of the first via hole structures 107 on the base substrate 101 have an overlapping portion, the orthographic projection of the third sub bent part 113*a* on the base substrate 101 and the orthographic projections of the first via hole structures 107 on the base substrate 101 have an overlapping part, and the orthographic projection of the fourth sub bent part 113*b* on the base substrate 101 is not overlapped with the orthographic projections of the first via hole structures 107 on the base substrate 101, and the embodiments of the present disclosure are not limited thereto.

For example, as illustrated by FIG. 2 to FIG. 8, a plurality of first via hole structures 107 are provided, and a plurality of second via hole structures 108 are provided, and the total number of the first via hole structures 107 and the second via hole structures 108 is greater than or equal to 150. The number design of the first via hole structures 107 and the second via hole structures 108 can ensure that the heat generated by the professional esports display at the refresh frequency of 240 Hz or 480 Hz will not affect the normal display of the display panel.

It should be noted that only a part of the first via hole structures 107 and the second via hole structures 108 are shown in the structures shown in FIG. 2 to FIG. 8, and a large number of the first via hole structures 107 and the second via hole structures 108 are omitted.

For example, as illustrated by FIG. 2 to FIG. 8, the first via hole structures 107 and the second via hole structures 108 are arranged in a matrix. The first direction X is a row direction and the second direction Y is a column direction. The sum of the numbers of the first via hole structures 107 and the second via hole structures 108 in one row along the first direction X is greater than or equal to 15, and the sum of the numbers of the first via hole structures 107 and the second via hole structures 108 in one column along the second direction Y is greater than or equal to 10. And the sum of the numbers of the first via hole structures 107 and the second via hole structures 108 in one row along the first direction X is greater than the sum of the numbers of the first via hole structures 107 and the second via hole structures 108 in one column along the second direction Y. For example, in one example, the sum of the numbers of the first via hole structures 107 and the second via hole structures 108 in each row is greater than or equal to 1.5 times the sum of the numbers of the first via hole structures 107 and the second via hole structures 108 in each column, so that the sum of the numbers of the first via hole structures 107 and the second via hole structures 108 can reach 150, and the first via hole structures 107 and the second via hole structures 108 are evenly distributed, so that the resistance of the parallel circuit is minimum. In addition, this design can also make the width of the conductive connection layer 104 narrower in the second direction Y, so that the distance between the edge of the lower part of the conductive connection layer 104 farthest from the display region 105 and the display region 105 is reduced, thereby reducing the width of the lower frame and making the width of the lower frame narrower.

For example, as illustrated by FIG. 2 to FIG. 8, the first via hole structures 107 and the second via hole structures 108 are arranged in a matrix. The first direction X is the row direction and the second direction Y is the column direction. The sum of the numbers of the first via hole structures 107 and the second via hole structures 108 in one row along the first direction X is greater than or equal to 10, and the sum of the numbers of the first via hole structures 107 and the second via hole structures 108 in one column along the second direction Y is greater than or equal to 15, and the sum of the numbers of the first via hole structures 107 and the second via hole structures 108 in one row along the first direction X is smaller than the sum of the numbers of the first via hole structures 107 and the second via hole structures 108 in one column along the second direction Y. For example, in one example, the sum of the numbers of the first via hole structures 107 and the second via hole structures 108 in each column is greater than or equal to 1.5 times the sum of the numbers of the first via hole structures 107 and the second via hole structures 108 in each row, so that the sum of the numbers of the first via hole structures 107 and the second via hole structures 108 can reach 150, and the first via hole structures 107 and the second via hole structures 108 are evenly distributed, so that the resistance of the parallel circuits is minimum. In addition, this design can also make the width of the conductive connection layer 104 narrower in the first direction X, so that the distance between the edges of the left and right parts of the conductive connection layer 104 farthest from the display region 105 and the display region 105 can be reduced, so that the widths of the left frame and right frame can be reduced, and make that the width between the left frame and the right frame narrower.

For example, FIG. 9 is a circuit diagram of a display panel at positions of a first via hole structure and a second via hole structure provided by at least one embodiment of the present disclosure. As illustrated by FIG. 9, R0 corresponds to the resistance of the conductive connection layer 104, R1 corresponds to the resistance of the first via hole structure 107 connecting the conductive connection layer 104 and the first common electrode bus line 102, and R2 corresponds to the resistance of the second via hole structure 108 connecting the conductive connection layer 104 and the second common electrode bus line 103. C1 corresponds to the coupling capacitance between the conductive connection layer 104 and the gate electrode (shown in FIG. 10), C2 corresponds to the coupling capacitance between the conductive connection layer 104 and the source-drain electrode layer (shown in FIG. 10), and C0 corresponds to the coupling capacitance between the gate electrode and the source-drain electrode layer. Although only three resistors R0, R1 and R2 and three capacitors C0, C1 and C2 are shown, the number of resistors and capacitors can be more in the embodiment of the present disclosure, and the more parallel circuits there are, the smaller the final resistance will be, resulting in less heat dissipation throughout the entire circuit.

For example, in one example, it is assumed that the current is I at a frequency of 60 Hz and the heat at a frequency of 480 Hz is 8 times that at a frequency of 60 Hz, the resistance of the conductive connection layer 104 between adjacent first via hole structures, adjacent first via hole structures and second via hole structures, or adjacent second via hole structures is 30 ohms under the condition that R1 is equal to R2, that is, the resistance of the resistor R0, and an analog value of the resistance of the via hole of 6 μm*6 μm is 80 ohms. In the arrangement diagram of 10*10 first via hole structures and second via hole structures under the condition of 60 Hz frequency, in this case, the three capacitors C0, C1 and C2 can be ignored, and the analog value of the comprehensive resistance of 10*10 of via holes with the same size of 6 μm*6 μm is about 40 ohms; in the arrangement diagram of the 10*30 first via hole structures and the second via hole structures, in this case, the three capacitors C0, C1 and C2 can be ignored, and the analog value of the comprehensive resistance of 10*30 via holes with the same size of 6 µm*6 µm is about 16 ohms, and the resistance value is reduced by 2.5 times. Under the condition of frequency of 480 Hz, in the arrangement diagram of 10*10 first via hole structures and second via hole structures, in this case, the three capacitors C0, C1 and C2 can be ignored, and the analog value of the comprehensive resistance of 10*10 via holes with the same size of 6 µm*6 µm is about 320 ohms; in the arrangement diagram of the 10*30 first via hole structures and the second via hole structures, in this case, the three capacitors C0, C1 and C2 can be ignored, and the analog value of the comprehensive resistance of 10*30 via holes with the same size of 6 µm*6 µm is about 128 ohms.

For example, in a comparative example, it is assumed that the current is I at a frequency of 60 Hz, the heat at a frequency of 165 Hz is 2.75 times that at 60 Hz, and R1 is equal to R2, and the values of R1 and R2 are both 400 ohms. The resistance of the conductive connection layer 104 between adjacent first via hole structures, adjacent first via hole structures and second via hole structures, or adjacent second via hole structures is 30 ohms, which is the resistance value of the resistor R0. The analog value of the resistance of the 24 µm*24 µm via hole is about 400 ohms. Under the condition of 60 Hz frequency, in the arrangement diagram of 2*2 first via hole structures and second via hole structures, in this case, the three capacitors C0, C1 and C2 can be ignored, and the analog value of the comprehensive resistance of 2*2 via holes with the same size of 24 µm*24 µm is about 130 ohms. Under the condition of frequency of 165 Hz, in the arrangement diagram of 2*2 first via hole structures and second via hole structures, in this case, the three capacitors C0, C1 and C2 can be ignored, and the analog value of the comprehensive resistance of 2*2 via holes with the same size of 24 µm*24 µm is about 357.5 ohms.

It can be seen from the above examples that the resistance R1 of the first via hole structure with the size of 24 µm*24 µm is five times that of the first via hole structure with the size of 6 µm*6 µm, and the resistance R2 of the second via hole structures with the size of 24 µm*24 µm is five times that of the second via hole structures with the size of 6 µm*6 µm, the via hole size of 6 µm*6 µm is the smallest size that can be achieved by the equipment in the factory at present. In some embodiments of the present disclosure, 6 µm*6 µm via holes are selected, and the smaller the first via hole structures 107 and the second via hole structures 108 are, the smaller the corresponding resistors R1 and R2 are.

For example, with reference to FIG. 2 to FIG. 8, the maximum dimension of the first via hole structures 107 and the second via hole structures 108 on the main plane parallel to the base substrate 101 ranges from 4 microns to 6 microns. For example, in one example, the plane shapes of the first via hole structures 107 and the second via hole structures 108 are the same, and the plane shapes of the first via hole structures 107 and the second via hole structures 108 are both rectangles with the same size, and the size of a long edge of the rectangle is 4 microns to 6 microns. In another example, the plane shapes of the first via hole structures 107 and the second via hole structures 108 are the same, and both of which are rectangular, but the plane shapes of the first via hole structures 107 and the plane shapes of the second via hole structures 108 have different sizes, and the size of the long edge of the rectangle with a larger long edge corresponding to the first via hole structures 107 and the second via hole structures 108 is 4 microns to 6 microns. In another example, the plane shape of the first via hole structure 107 and the plane shape of the second via hole structure 108 are the same, both of which are circular, but the plane shape of the first via hole structure 107 and the plane shape of the second via hole structure 108 are different in size, and the diameter of a circle with a larger diameter corresponding to the first via hole structure 107 and the second via hole structure 108 is 4 microns to 6 microns. In another example, the plane shape of the first via hole structure 107 and the plane shape of the second via hole structure 108 are the same, both of which are elliptical, but the plane shape of the first via hole structure 107 and the plane shape of the second via hole structure 108 are different in size, and the size of the major diameter of the ellipse with a larger major diameter corresponding to the first via hole structure 107 and the second via hole structure 108 is 4 microns to 6 microns. The plane shape of the first via hole structure 107 and the plane shape of the second via hole structure 108 can also be other shapes, and the cases of other shapes are compared according to similar rules, which is not limited by the embodiment of the present disclosure.

For example, with reference to FIG. 2, on a plane parallel to the main surface of the base substrate 101, a plane shape of the third via hole structure 116 may be the same as or different from that of the first via hole structure 107 and the second via hole structure 108. The maximum size of the plane shape of the third via hole structure 116 is larger than the maximum size of the plane shape of the first via hole structure 107 and the maximum size of the plane shape of the second via hole structure 108.

Figure 10:
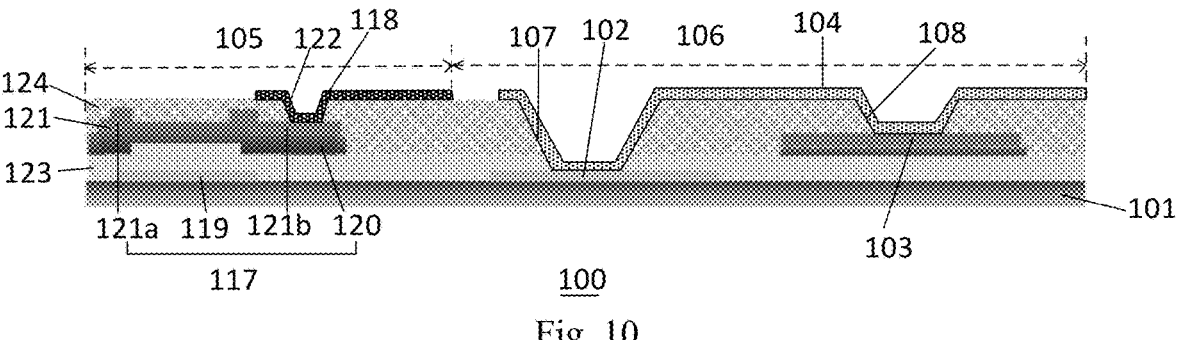
FIG. 10 is a schematic cross-sectional view of a display panel provided by at least one embodiment of the present disclosure.

For example, FIG. 10 is a schematic cross-sectional structure diagram of a display panel provided by at least one embodiment of the present disclosure. As illustrated by FIG. 10, the display panel 100 further includes a thin film transistor 117 and a first electrode 118, which are arranged at the base substrate 101 and in the display region 105. The thin film transistor 117 includes a gate electrode 119, an active layer 120 and a source-drain electrode layer 121 which are stacked. The source-drain electrode layer 121 includes a source electrode 121a and a drain electrode 121b which are oppositely arranged. The first common electrode bus line 102 and the gate electrode 119 are arranged in the same layer, and the second common electrode bus line 103 is arranged in the same layer with the source electrode 121a and the drain electrode 121b. The conductive connection layer 104 and the first electrode 118 are arranged in the same layer and spaced apart from each other, and the first electrode 118 is electrically connected with the drain electrode 121b through the fourth via hole structure 122.

For example, the thin film transistor 117 may be a top gate type thin film transistor, a bottom gate type thin film transistor or a double gate type thin film transistor, which is not limited by the embodiment of the present disclosure.

For example, in the embodiment of the present disclosure, "the same layer" refers to a layer structure that uses the same film forming process to form a film layer for forming a specific pattern, and then uses the same mask to form a layer structure through a patterning process. According to different specific patterns, the sequential patterning process may include multiple exposure, development or etching processes, and the specific patterns formed in the same layer may be continuous or discontinuous, and these specific patterns may also be at different heights or have different thicknesses.

For example, as illustrated by FIG. 10, a gate insulating layer 123 is provided at a side of the gate electrode 119 away from the base substrate 101, and a passivation layer 124 is provided at a side of the source-drain electrode layer 121 away from the base substrate 101. The first via hole structure 107 sequentially passes through the passivation layer 124 and the gate insulating layer 123, and both the second via hole structure 108 and the fourth via hole structure 122 pass through the passivation layer 124.

For example, in combination with FIG. 2, in a plane parallel to the main surface of the base substrate 101 and in a display panel, two second common electrode bus lines 103 are arranged, and the two second common electrode bus lines 103 are oppositely arranged at both sides of the main body part 102*a* of the first common electrode bus line 102 in the first direction X, the display panel 100 further includes a fourth common electrode bus line 125 arranged at a side of the third common electrode bus line 126 away from the display region 105, the main body part of the fourth common electrode bus line 125 is parallel to the main body part 102*a* of the first common electrode bus line 102, and the fourth common electrode bus line 125 and the first common electrode bus line 102 are arranged in the same layer. The two second common electrode bus lines 103 respectively include a second end 103*b* and a third end 103*c* which are away from the first common electrode bus line 102 in the first direction X. The conductive connection layer 104 is electrically connected with the second end 103*b* and the third end 103*c* through a fifth via hole structure 127. The fourth common electrode bus line 125 includes a fourth end 125*a* opposite to the second end 103*b* and a fifth end 125*b* opposite to the third end 103*c*, the conductive connection layer 104 is electrically connected with the fourth end 125*a* and the fifth end 125*b* through a sixth via hole structure 128.

For example, as illustrated by FIG. 2, the fourth common electrode bus line 125 is arranged at a side of the electrostatic lead wire 111 away from the display region 105, and the fourth common electrode bus line 125, the third common electrode bus line 126 and the second common electrode bus line 103 are electrically connected through the conductive connection layer 104.

For example, with reference to FIG. 2, the middle part between the two ends of the third common electrode bus line 126 is electrically connected with the conductive connection layer 104 through a seventh via hole structure 129, and the arrangement density, plane shape and size of the seventh via hole structure 129 can be the same as that of the third via hole structure 116, which will not be described in detail here.

At least one embodiment of the present disclosure further provides a display device, and the display device includes any one of the display panels in the above embodiments. Because the display device includes the display panel in any of the above embodiments, the structural design of the display device can also achieve that the branch part is arranged further away from the display region, so that a larger region on the branch part can be provided with more via hole structures, and the number of the first via hole structures and the number of the second via hole structures are increased, so as to reduce the resistance in the circuit structure, so as to prevent the first via hole structures and the second via hole structures being burnt out, which leads to the problems of the reduction of the product yield of the display device and the short lifespan of the display device. Moreover, in the case that the display device is a liquid crystal display device, the first via hole structures and the second via hole structures are arranged away from the display region, and the problem that the temperature of the liquid crystal layer in the display region of the liquid crystal display panel is raised to reach the clear point of the liquid crystal by the heat radiated from the first via hole structures and the second via hole structures can be avoided. That is, the resistance at the junction of the conductive connection layer in the display device is small, and the heat is small, so the display device has better product performance and better display effect.

For example, the display device can be a liquid crystal display device, such as a mobile phone, a tablet computer, a television, a display, a notebook computer, a digital photo frame, a navigator and any other products or components with display functions, which are not limited by the embodiments of the present disclosure.

The display panel and the display device provided by at least one embodiment of the present disclosure have at least one of the following beneficial technical effects:

(1) In the display panel provided by at least one embodiment of the present disclosure, in the peripheral region, the conductive connection layer is connected with the branch part of the first common electrode bus line through the first via hole structures, and the conductive connection layer is electrically connected with the first end of the second common electrode bus line through the second via hole structures, so that the number of the first via hole structures and the number of the second via hole structures can be increased, and the resistance in the circuit structure can be reduced, so as to prevent the first via hole structures and the second via hole structures from burning out, which leads to the reduction of the product yield of the display panel and the short lifespan of the display panel.

(2) In the display panel provided by at least one embodiment of the present disclosure, in the case that the display panel is a liquid crystal display panel, the first via hole structures and the second via hole structures are arranged away from the display region, and the problem that the temperature of the liquid crystal layer in the display region of the liquid crystal display panel is raised to reach the clear point of the liquid crystal by the heat radiated from the first via hole structure and the second via hole structure can also be avoided.

The following points need to be explained:

(1) The drawings of the embodiment of the present disclosure only relate to the structure related to the embodiment of the present disclosure, and other structures can refer to the general design.

(2) For the sake of clarity, in the drawings used to describe the embodiments of the present disclosure, the thickness of layers or regions is enlarged or reduced, that is, these drawings are not drawn to actual scale.

(3) In the case of no conflict, the embodiments of the present disclosure and the features in the embodiments can be combined with each other to obtain a new embodiment.

The above is only the specific implementation of the present disclosure, but the scope of protection of the present disclosure is not limited thereto, and the scope of protection of the present disclosure should be subject to the scope of protection of the claims.

The invention claimed is:

1. A display panel, comprising:

a base substrate, comprising a display region and a peripheral region surrounding the display region;

a first common electrode bus line, a second common electrode bus line and a conductive connection layer which are stacked on the base substrate and in the peripheral region, wherein the first common electrode bus line comprises a main body part and a branch part extending from an end of the main body part to a side away from the display region, the main body part extends along a first direction, and at least a part of the branch part connected with the main body part extends along a second direction, and the first direction intersects with the second direction;

the second common electrode bus line extends along the second direction to a side away from the display region, and a first end of the second common electrode bus line directly faces the end of the main body part and the branch part;

in the peripheral region, the conductive connection layer is electrically connected with the branch part of the first common electrode bus line through a first via hole structure, and the conductive connection layer is electrically connected with the first end of the second common electrode bus line through a second via hole structure, an orthographic projection of the first via hole structure on the base substrate at least partially overlaps with an orthographic projection of the branch part on the base substrate.

2. The display panel according to claim 1, wherein, on a plane parallel to a main surface of the base substrate, the branch part at least comprises a first bent part away from the display region, and the orthographic projection of the first via hole structure on the base substrate is at least partially overlapped with an orthographic projection of the first bent part on the base substrate.

3. The display panel according to claim 2, wherein, on the plane parallel to the main surface of the base substrate, the first end extends into an opening region defined by the first bent part, and an orthographic projection of the second via hole structure on the base substrate is at least partially overlapped with an orthographic projection of the first end on the base substrate.

4. The display panel according to claim 2, wherein the first bent part comprises a first sub bent part extending along the second direction and a second sub bent part extending along the first direction to a side close to the second common electrode bus line, an extending direction of the second common electrode bus line is parallel to the second direction, and an orthographic projection of the first sub bent part on the base substrate and the orthographic projection of the first via hole structure on the base substrate have an overlapping part, and an orthographic projection of the second sub bent part on the base substrate and the orthographic projection of the first via hole structure on the base substrate have an overlapping part.

5. The display panel according to claim 2, wherein the first bent part comprises a first sub bent part extending along the second direction and a second sub bent part extending along the first direction to a side close to the second common electrode bus line, an extending direction of the second common electrode bus line is parallel to the second direction, and an orthographic projection of the first sub bent part on the base substrate and the orthographic projection of the first via hole structure on the base substrate have an overlapping part, and an orthographic projection of the second sub bent part on the base substrate is not overlapped with the orthographic projection of the first via hole structure on the base substrate.

6. The display panel according to claim 2, wherein the first bent part comprises a first sub bent part extending along the second direction and a second sub bent part extending along the first direction to a side close to the second common electrode bus line, an extending direction of the second common electrode bus line is parallel to the second direction, and an orthographic projection of the first sub bent part on the base substrate is not overlapped with the orthographic projection of the first via hole structure on the base substrate, and an orthographic projection of the second sub bent part on the base substrate and the orthographic projection of the first via hole structure on the base substrate have an overlapping part.

7. The display panel according to claim 4, wherein, on the plane parallel to the main surface of the base substrate, the branch part further comprises a second bent part away from the display region, and the second bent part comprises a third sub bent part extending in the second direction and a fourth sub bent part extending in the first direction, and the second sub bent part and the fourth sub bent part are connected to make an overall shape of the first bent part and the second bent part form a "U" shape, and the second common electrode bus line extends into an opening of the "U" shape.

8. The display panel according to claim 7, wherein an orthographic projection of the third sub bent part on the base substrate and the orthographic projection of the first via hole structure on the base substrate have an overlapping part, and an orthographic projection of the fourth sub bent part on the base substrate and the orthographic projection of the first via hole structure on the base substrate have an overlapping part.

9. The display panel according to claim 7, wherein an orthographic projection of the third sub bent part on the base substrate and the orthographic projection of the first via hole structure on the base substrate have an overlapping part, and an orthographic projection of the fourth sub bent part on the base substrate is not overlapped with the orthographic projection of the first via hole structure on the base substrate.

10. The display panel according to claim 1, wherein, on a plane parallel to a main surface of the base substrate, the main body part of the first common electrode bus line is arranged in a direction parallel to the first direction, a third via hole structure is arranged at the main body part, and the main body part is electrically connected with the conductive connection layer through the third via hole structure.

11. The display panel according to claim 1, wherein a minimum distance between the first via hole structure and the display region and a minimum distance between the second via hole structure and the display region are both greater than 500 microns.

12. The display panel according to claim 1, wherein a plurality of first via hole structures are provided, and a plurality of second via hole structures are provided, and a total number of the first via hole structures and the second via hole structures is greater than or equal to 150.

13. The display panel according to claim 12, wherein the first via hole structures and the second via hole structures are arranged in a matrix, the first direction is a row direction and the second direction is a column direction, a sum of numbers of the first via hole structures and the second via hole structures in a row along the first direction is greater than 15, and a sum of numbers of the first via hole structures and the second via hole structures in a column along the second direction is greater than 10, and the sum of the numbers of the first via hole structures and the second via hole structures in the row along the first direction is greater than the sum of the numbers of the first via hole structures and the second via hole structures in the column along the second direction.

14. The display panel according to claim 12, wherein the first via hole structures and the second via hole structures are arranged in a matrix, the first direction is a row direction and the second direction is a column direction, a sum of numbers of the first via hole structures and the second via hole structures in a row along the first direction is greater than 10, and a sum of numbers of the first via hole structures and the second via hole structures in a column along the second direction is greater than 15, and the sum of the numbers of the first via hole structures and the second via hole structures in the row along the first direction is smaller than the sum of the numbers of the first via hole structures and the second via hole structures in the column along the second direction.

15. The display panel according to claim 1, wherein maximum dimensions of the first via hole structure and the second via hole structure on the main plane parallel to the base substrate range from 4 microns to 6 microns respectively.

16. The display panel according to claim 1, further comprising: a thin film transistor and a first electrode arranged on the base substrate and in the display region, wherein the thin film transistor comprises a gate electrode, an active layer and a source-drain electrode layer which are stacked, the source-drain electrode layer comprises a source electrode and a drain electrode which are arranged oppositely, the first common electrode bus line and the gate electrode are arranged in the same layer, and the second common electrode bus line, the source electrode and the drain electrode are arranged in the same layer, the conductive connection layer and the first electrode are arranged in the same layer and spaced apart from each other, and the first electrode is connected with the drain electrode through a fourth via hole structure.

17. The display panel according to claim 16, wherein a gate insulating layer is arranged at a side of the gate electrode away from the base substrate, and a passivation layer is arranged at a side of the source-drain electrode layer away from the base substrate, and the first via hole structure sequentially penetrates the passivation layer and the gate insulating layer, and both the second via hole structure and the fourth via hole structure penetrate the passivation layer.

18. The display panel according to claim 1, wherein, on a plane parallel to a main surface of the base substrate, and in one of the display panel, two second common electrode bus lines are arranged, and the two second common electrode bus lines are oppositely arranged at both sides of the main body part of the first common electrode bus line in the first direction;

the display panel further comprises a third common electrode bus line arranged opposite to the first common electrode bus line in the second direction, the third common electrode bus line is parallel to the main body part of the first common electrode bus line, and the third common electrode bus line and the first common electrode bus line are arranged in the same layer, and the two second common electrode bus lines, the first common electrode bus line and the third common electrode bus line are arranged around the display region;

the two second common electrode bus lines respectively comprise a second end and a third end which are away from the first common electrode bus line in the first direction, and the conductive connection layer is electrically connected with the second end and the third end through a fifth via hole structure;

the third common electrode bus line comprises a fourth end opposite to the second end and a fifth end opposite to the third end, and the conductive connection layer is electrically connected with the fourth end and the fifth end through a sixth via hole structure.

19. The display panel according to claim 18, wherein a part of the third common electrode bus line between the fourth end and the fifth end is electrically connected with the conductive connection layer through a seventh via hole structure.

20. A display device, comprising a display panel, wherein the display panel comprises:

a base substrate, comprising a display region and a peripheral region surrounding the display region;

a first common electrode bus line, a second common electrode bus line and a conductive connection layer which are stacked on the base substrate and in the peripheral region, wherein the first common electrode bus line comprises a main body part and a branch part extending from an end of the main body part to a side away from the display region, the main body part extends along a first direction, and at least a part of the branch part connected with the main body part extends along a second direction, and the first direction intersects with the second direction;

the second common electrode bus line extends along the second direction to a side away from the display region, and a first end of the second common electrode bus line directly faces the end of the main body part and the branch part;

in the peripheral region, the conductive connection layer is electrically connected with the branch part of the first common electrode bus line through a first via hole structure, and the conductive connection layer is electrically connected with the first end of the second common electrode bus line through a second via hole structure, an orthographic projection of the first via hole structure on the base substrate at least partially overlaps with an orthographic projection of the branch part on the base substrate.

* * * * *